Aug. 18, 1959  F. W. BENKE  2,900,611
METHOD OF RESTRAINING FORCES OF NON-CIRCULAR CYLINDRICAL COILS
Filed Jan. 10, 1957

WITNESSES

INVENTOR
Frank W. Benke
BY
ATTORNEY

United States Patent Office 2,900,611
Patented Aug. 18, 1959

2,900,611

A METHOD OF RESTRAINING FORCES OF NON-CIRCULAR CYLINDRICAL COILS

Frank W. Benke, Hickory Township, Mercer County, Pa., assignor to Westinghouse Electric Corporation, East Pittsburgh, Pa., a corporation of Pennsylvania Application January 10, 1957, Serial No. 633,434

2 Claims. (Cl. 336—100)

The invention relates generally to non-circular cylindrical coils for inductive apparatus and more particularly to non-circular cylindrical coils for transformers.

In the manufacture of inductive apparatus and in particular transformers, it has been desirable to use non-circular cylindrical coils in the interest of space factor and the most efficient size and shape of cores. When the coils are non-circular in cross section the electromagnetic stresses set up tend to distort them and even apply stresses to the cores on which they are mounted. With the advent of the wound core when excessive stresses are applied to the coils there is a danger of the stresses so distorting the coils that the cores also are distorted and stresses locked in the cores which seriously increase the core losses.

An object of the invention is to provide for so supporting non-circular coils that they are not subjected to any substantial distortion when energized.

It is also an object of the invention to so support non-circular coils applied to induction apparatus that the individual coils are not distorted and core and coils are maintained in predetermined assembled relationship.

A further object of the invention is the provision of means for so supporting cylindrical coils of non-circular cross-section disposed on wound cores that they will not distort the core or produce locked in stresses and increase in the core losses.

Other objects of the invention will, in part, be obvious and will, in part, appear hereinafter.

The invention accordingly comprises the features of construction, combination of elements and arrangement of parts which will be exemplified in the system hereinafter set forth, and the scope of the application of which will be indicated in the claims.

For a fuller understanding of the nature and objects of the invention, reference may be had to the following detailed description taken in connection with the accompanying drawing, in which.

Figure 1:
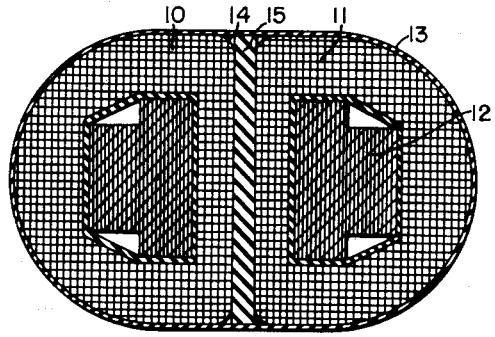
Figure 1 is a view in section of a single-phase transformer showing a plurality of non-circular coils banded in accordance with the teachings of the invention.

Referring now to the drawing and Fig. 1 in particular, a plurality of preformed non-circular coils 10 and 11 are shown applied to a single-phase trainsformer core 12. In this particular instance, the coils 10 and 11 are made to simulate a D in cross-section. However, coils 10 and 11 of other shapes may be employed to meet specific specifications in transformer construction.

When non-circular coils such as 10 and 11 are energized, the electromagnetic stresses developed will tend to distort them. Generally, the electromagnetic forces are evenly distributed and tend to force the coils into a substantially circular shape. The electromagnetic stresses applied to non-circular coils in the ordinary operation of transformers are not apt to cause serious damage. However, on short-circuit tests or on the occurrence of a short circuit during operation the electromagnetic forces applied are very great and serious distortion may be effective if provision is not made to withstand such short-circuit stresses.

Cores of many different types may be employed with D-shaped coils. With some types of cores the coils would have to be very greatly distorted before the cores would be affected. It has been found that when non-circular coils such as the D-shaped coils 10 and 11 are mounted on cores of the wound type, there is a greater possibility because of the shape of a wound core that it may be so distorted on the distortion of the coils as to result in the locking of stresses in the core iron. Stresses locked in core iron may cause a substantial increase in core losses.

When non-circular coils such as the D coils 10 and 11 are employed, it is generally easy to insulate the coils from one another. As shown in Fig. 1, the coils 10 and 11 are disposed with their flat sides facing inwardly. Then depending on the voltage between the coils insulation 15 will be disposed between the flat sides. The amount of insulation employed will depend on the specification of the transformer and the voltage to be withstood. Solid insulation suitable for this purpose is well known in the art and need not be discussed in detail.

The coils 10 and 11 will be wound from insulated wire which will meet the conditions under which the coils are to be operated. The methods for building non-circular coils are well known and such coils can be built by anyone skilled in the art. It is usual practice when coils of this type are preformed that they are wound with a cotton covering 14 to hold them together and protect them during the building of the transformer or other induction apparatus.

When the coils 10 and 11 have been assembled on the core 12 as shown in Fig. 1, bands 13 will be wound around them. In this particular showing the bands 13 are applied at intervals throughout the length of the coils. However, it will be readily appreciated that the fundamental of the invention is to support the coils 10 and 11 so that they will not be distorted either during use when subjected to electromagnetic stresses great enough to deform them or on short circuit of the coils either during tests or during use. Therefore, it would be possible to support the coils by winding them throughout their length.

Many different materials may be employed for the bands 13 or winding applied throughout the length of the coils. Glass cloth impregnated with any of the well-known resinous materials having insulating characteristics may be utilized. Glass fibers impregnated with polyester resins in the partially cured state have been utilized with success. When bands 13 of glass fibers impregnated with polyester resins in the partially cured state are applied, the curing of the polyester resins will be completed when the core and coils are baked to complete the curing of the insulating resins and the driving off of any moisture that may be contained in the coil insulation. On the complete curing of the polyester resins the bands will tend to shrink and they will draw the coils 10 and 11 into tight contact with the insulation and form a very rigid structure. The number of turns of glass fibers impregnated with polyester resins applied to make a band or a complete winding will depend on the forces to be withstood. Generally, in building transformers, the designer can determine the electromagnetic stresses that will be applied on short circuit and therefore can specify the windings required.

Impregnated glass cloth or glass fibers lend themselves very nicely to this use, since they take the shape of the coils and do not readily deteriorate. Further, glass cloth or fibers impregnated with polyester or similar resins have insulating characteristics which make them highly suitable for such uses.

Figure 2:
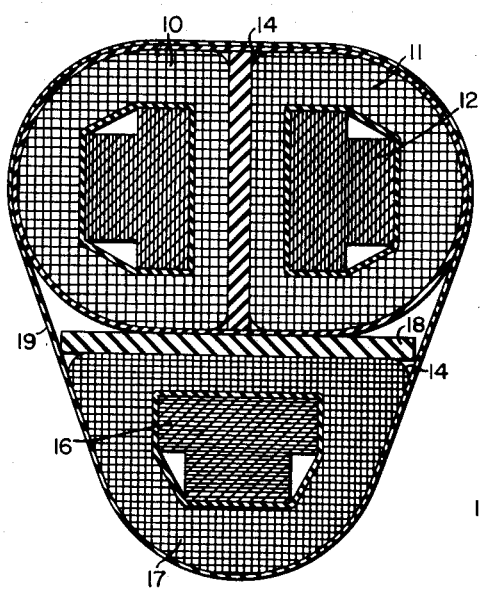
Fig. 2 is a view in cross section of a three-phase transformer showing the preformed non-circular coils banded in groups to maintain them in assembled relationship.
Figure 3:
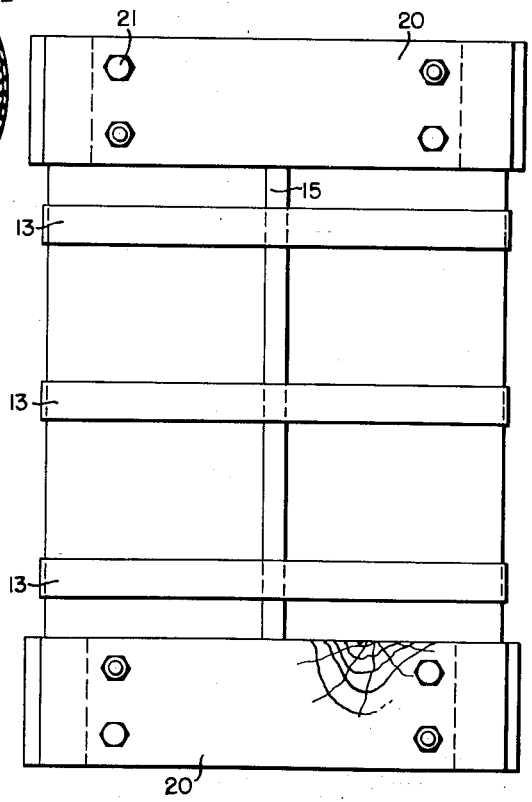
Fig. 3 is a view in side elevation of a transformer showing the core and coils arranged in accordance with the teachings of the invention.

The three-phase transformer illustrated in Fig. 2 may employ any well-known type of three-phase transformer core. In this embodiment of the invention the upper portion of the structure is similar to that shown in Fig. 1. In addition, a core leg 16 is made from a section of a wound core with faces provided on the laterally turned portions to engage the sides of the core 12. The coil 17 mounted on the core leg 16 will be similar to the coils 10 and 11. In assembling the core and coils, insulation 18 will be disposed between the upper coils 10 and 11 and the coil 17. When the core 12 and the third core leg 16 carrying their respective coils have been disposed in properly assembled relationship, the bands 19 of glass fibers or glass cloth impregnated with a resin in a partially cured state will be applied.

With this much information it will be readily appreciated that anyone skilled in the art can prepare non-cylindrical coils of any design, mount them on cores and so support them in accordance with the teachings of this invention that they will not be distorted in shape and the cores subjected to stresses which may develop high core losses.

When the coils of a transformer have been supported in the manner described, the whole structure is ready for mounting in a transformer tank. In doing this blocks of insulating material such as 20 are clamped on opposite sides of the core structure to hold the laminations in place. These blocks 20 may be drawn together by bolts and nuts 21. It is common practice to use wooden blocks for clamping the cores to keep them in shape.

Since certain changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. In an inductive device, a non-circular electrical coil, said electrical coil being adapted to be energized from a source of electrical energy, a magnetic core disposed in said coil, and a band of glass fibers impregnated with a resinous material and comprising a plurality of layers tightly surrounding said coil.

2. In an inductive device, a non-circular electrical coil, said electrical coil being adapted to be energized from a source of electrical energy, a magnetic core disposed in said coil, and a band of glass fibers impregnated with a polyester resin and comprising a plurality of layers tightly surrounding said coil.

References Cited in the file of this patent

UNITED STATES PATENTS

| | | |
|---|---|---|
| 2,314,912 | Troy | Mar. 30, 1943 |
| 2,436,207 | D'Entremont | Feb. 17, 1948 |
| 2,456,941 | Hodnette | Dec. 21, 1948 |
| 2,663,828 | Sauer | Dec. 22, 1953 |